United States Patent
Lotfi et al.

(10) Patent No.: US 10,601,673 B2
(45) Date of Patent: Mar. 24, 2020

(54) HOLISTIC VALIDATION OF A NETWORK VIA NATIVE COMMUNICATIONS ACROSS A MIRRORED EMULATION OF THE NETWORK

(71) Applicant: Tesuto Inc., Pacific Palisades, CA (US)

(72) Inventors: Hossein Lotfi, Pacific Palisades, CA (US); Christopher Bradley, Walnut Creek, CA (US)

(73) Assignee: Tesuto Inc., Pacific Palisades, CA (US)

( * ) Notice: Subject to any disclaimer, the term of this patent is extended or adjusted under 35 U.S.C. 154(b) by 11 days.

(21) Appl. No.: 15/871,627

(22) Filed: Jan. 15, 2018

(65) Prior Publication Data

US 2019/0097894 A1   Mar. 28, 2019

Related U.S. Application Data

(63) Continuation of application No. 15/727,681, filed on Oct. 9, 2017, now Pat. No. 9,882,784.

(Continued)

(51) Int. Cl.
*H04L 12/24* (2006.01)
*G06F 9/50* (2006.01)
(Continued)

(52) U.S. Cl.
CPC ........ *H04L 41/145* (2013.01); *G06F 9/45558* (2013.01); *G06F 9/5027* (2013.01); *G06F 9/5077* (2013.01); *H04L 12/4675* (2013.01); *H04L 41/12* (2013.01); *H04L 67/10* (2013.01);

*G06F 2009/45595* (2013.01); *H04L 41/08* (2013.01); *H04L 67/34* (2013.01)

(58) Field of Classification Search
None
See application file for complete search history.

(56) References Cited

U.S. PATENT DOCUMENTS 5,894,566 A * 4/1999 Croslin ................. H04L 41/065
                                                                        703/21
7,555,421 B1 * 6/2009 Beckett ............... G06F 9/45537
                                                                        703/23

(Continued)

*Primary Examiner* — Brian Whipple
(74) *Attorney, Agent, or Firm* — Ansari Katiraei LLP; Arman Katiraei; Sadig Ansari

(57) ABSTRACT

A replication of a physical network is created in the cloud. The replicated network safely validates configuration changes for any hardware network device of the physical network and the physical network end state resulting from the changes without impacting the physical network steady state. The replicated network creates virtual machines on hardware resources provisioned from the cloud. The virtual machines emulate network device functionality and have the same addressing as the network devices. Nested overlay networks reproduce the direct connectivity that exists between different pairs of the network devices on the virtual machines. A first overlay network formed by a first Virtual Extensible Local Area Network (VXLAN) provides direct logical connections between the cloud machines on which the virtual machines execute. A second overlay network of VXLANs leverages the first VXLAN to establish direct logical connections between the virtual machines that mirror the direct connections between the network devices.

20 Claims, 12 Drawing Sheets

Related U.S. Application Data

(60) Provisional application No. 62/563,574, filed on Sep. 26, 2017.

(51) Int. Cl.
  *H04L 12/46* (2006.01)
  *G06F 9/455* (2018.01)
  *H04L 29/08* (2006.01)

(56) References Cited

U.S. PATENT DOCUMENTS

| | | |
|---|---|---|
| 9,146,721 B1 | 9/2015 | Nagaraja et al. |
| 9,172,621 B1 | 10/2015 | Dippenaar |
| 9,305,164 B1 | 4/2016 | Brandwine et al. |
| 2008/0307519 A1 | 12/2008 | Curcio et al. |
| 2011/0134793 A1* | 6/2011 | Elsen .................. H04L 12/462 370/254 |
| 2013/0174149 A1 | 7/2013 | Dasgupta et al. |
| 2014/0177471 A1 | 6/2014 | Kharitonov et al. |
| 2014/0337837 A1 | 11/2014 | Padala et al. |
| 2016/0117231 A1 | 4/2016 | Lee et al. |
| 2017/0163599 A1 | 6/2017 | Shen et al. |

* cited by examiner

HOLISTIC VALIDATION OF A NETWORK VIA NATIVE COMMUNICATIONS ACROSS A MIRRORED EMULATION OF THE NETWORK

CLAIM OF BENEFIT TO RELATED APPLICATIONS

This application is a continuation of U.S. nonprovisional application Ser. No. 15/727,681, entitled "Holistic Validation of a Network Via Native Communications Across a Mirrored Emulation of the Network", filed Oct. 9, 2017 which claims the benefit of U.S. provisional application 62/563,574, entitled "Holistic Validation of a Network Via Native Communications Across a Mirrored Emulation of the Network", filed Sep. 26, 2017.

TECHNICAL FIELD

The present invention relates to computer networks.

BACKGROUND ART

Network outages are primarily due to human error. More specifically, these errors are the byproduct of improper changes or unforeseen consequences from changes made to the configurations that control how network devices connect and exchange frames, packets, and other data with other network devices. Network devices such as hardware network devices, switches, load balancers, firewall appliances, etc. can produce the outages or other error conditions based on a misconfiguration. Outages occur despite best efforts to validate the configurations and configuration changes before they are deployed to the network devices.

Current validation tools and methodologies are insufficient because they do not provide a comprehensive validation of a configuration change and the impact of the change across each and every network device of the network. Laboratory testing and canary testing are two examples of widely used validation methodologies that suffer these shortcomings.

Laboratory testing provides a safe environment with which to test configuration changes apart from the actual network. Test are conducted against a small sampling of networking hardware that is representative of the physical network devices deployed in the network. However, the network hardware used for the laboratory testing is not connected to the actual network. Accordingly, any laboratory testing validation is incomplete because it is conducted against a fractional reproduction of the actual network. This fractional reproduction cannot account for the actual topology, connectivity, or interoperation between the network devices in the actual network. The fractional reproduction also cannot identify the true end state of the network because of the missing connectivity and hardware. In other words, the full propagation and impact of a configuration change across the entire network cannot be identified from the partial validation provided by the laboratory testing.

Unlike laboratory testing, canary testing can be done against the network devices of the actual network so as to account for the network or device state and the impact of a configuration change to these states. Canary testing involves testing the configuration change against a small subset of the actual network. If no errors are observed in that small subset, the configuration change is applied and validated against a larger subset of the network. In any canary testing stage, the validation is of limited scope, because some errors and outages resulting from a configuration change may be outside the subset of network devices under test or observation. Canary testing can therefore provide a false validation. Canary testing therefore cannot be used to holistically or comprehensively validate the network end state as canary testing necessarily requires segmenting the network for partial or sampled validation.

Accordingly, there is a need to holistically validate network configuration changes without impacting the current steady state of the network. The holistic validation should identify a modified end state of a network resulting from one or more changes to configurations of the hardware or physical network devices without modifying the running configurations on the network devices.

The only true means by which to achieve holistic validation of the network end state today is to apply the configuration changes directly to the actual network and to detect and correct the errors as they happen. Implementing changes without knowing the full scope of risk for outages, blackholes, lost traffic, etc. in the network is, however, unacceptable as such errors result in lost productivity, lost revenue, and interruption to content and services.

BRIEF DESCRIPTION OF THE DRAWINGS

A preferred embodiment for holistic validation of a network via native communication across a mirrored emulation of the network will now be described, by way of example only, with reference to the accompanying drawings in which.

DETAILED DESCRIPTION

I. Overview

Figure 1:
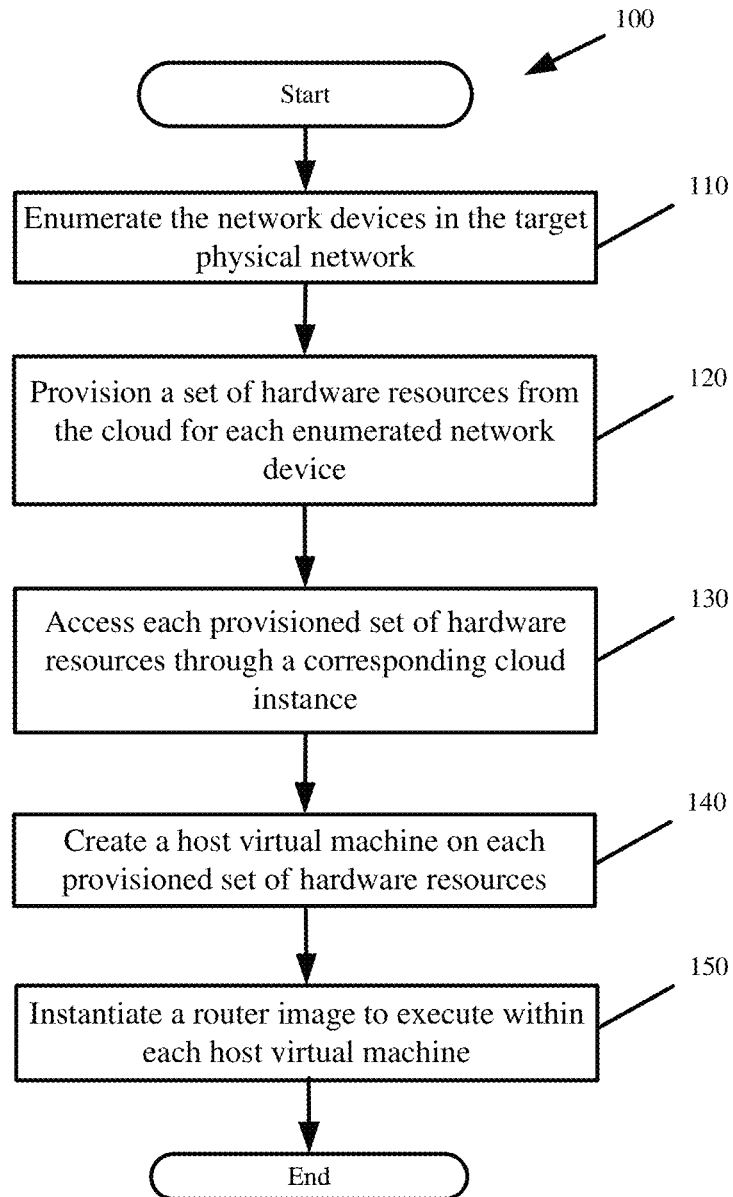
FIG. 1 presents a process for creating emulated network devices that mirror network devices of a target physical network in accordance with some embodiments.

Disclosed are embodiments for replicating a target physical network comprising a plurality of hardware network devices in the cloud. The replicated network comprises a distributed set of hardware resources (i.e., cloud machines). The distributed set of hardware resources execute emulated network devices that collectively recreate the functionality and operation of the hardware network devices of the target physical network. Some embodiments replicate the same topology and the same direct network connectivity that exists between the hardware network devices of the target physical network across the distributed set of hardware resources and the emulated network devices based on nested overlay networks. By mirroring the topology and direct connectivity that exists between the hardware network devices in the cloud, the replicated network is further able to mirror the native communication that occurs between the hardware network devices of the target physical network, wherein the native communication involves retaining layer 2 broadcast domains and layer 2 forwarding of frames between directly connected network devices. The replicated network mirrors the target physical network from the data link layer or layer 2 of the Open Systems Interconnection (OSI) model up to the higher layers.

Several challenges are overcome to achieve the disclosed embodiments for replicating different physical networks, direct connectivity, and native communication between hardware network devices of those networks in the cloud. A cloud service provider, such as Amazon Web Services or Google Compute Engine, provides distributed sets of hardware resources to different customers. These different sets of hardware resources can be reconfigured in virtually any manner desired by the customer for virtually any purpose. For the disclosed embodiments, the distributed sets of hardware resources are configured to emulate different hardware network devices of a target physical network including hardware routers, switches, load balances, and firewalls as some examples. However, the cloud resources can be located in different server farms in different geographic regions. There is no control over which resources the cloud allocates or the specific location of the resources. This is especially true when replicating a target physical network using resources of two or more cloud service providers. As such, the set of hardware resource that are allocated from the cloud and that are used to run the emulated network devices will not have the direct connectivity that exists between the hardware network devices of the target physical network. This occurs even when the distributed sets of hardware resources for the replicated network are provisioned from a private cloud (e.g., OpenStack). Moreover, the emulated network devices are created on and execute within other virtual machines or cloud instances that control and provide access to the hardware resources of the cloud machines. Due to this encapsulated execution of the emulated network devices within the cloud instances, there is an additional networking or network interface layer that prevents the emulated network devices from having any direct connectivity with one another, let alone, direct connectivity that mirrors the connectivity that exists between the hardware network devices of the target physical network. To even communicate with one another, the emulated network devices send and receive packets through the ethernet interfaces of the corresponding cloud instances in which the emulated network devices execute. The ethernet interfaces of the cloud instances will have different addressing than the ethernet interfaces of the hardware network devices. The native communication occurring within the target physical network cannot be replicated because of the different addressing. The embodiments resolve these addressing, connectivity, and other issues in order to replicate the specific topology, direct connectivity, and native communication of different physical networks with arbitrary allocations of cloud resources and nested execution of emulated network devices within cloud instances.

By successfully replicating the topology, direct connectivity, and native communication of a target physical network in the cloud, some embodiments are then able to holistically and comprehensively validate configuration changes and their impact to the end state of the target physical network in the cloud without impacting the existing steady state of the target physical network. The validation allows network administrators to detect through the replicated network, the very same blackholes, loops, improper routing, improper traffic management, improper attack protections, and other errors that would manifest anywhere in the target physical network as a result of a changed configuration without introducing any such errors in the target physical network.

More specifically, changes to configurations of one or more hardware network devices of a target physical network are applied to the corresponding emulated network devices in the replicated network instead of the one or more hardware network devices. Because the emulated network devices have the same direct connectivity and native communications as the hardware network devices, the impact of the changes on the target physical network are exactly reproduced in the replicated network. This includes reproducing the exact end state that would occur in the target physical network as a result of the changes by reproducing the full cascading effect of the changes at each and every replicated connection and emulated network device of the replicated network without impacting the steady state of the physical network.

II. Network Replication

Replicating a target physical network involves, for each physical or hardware network device of the target physical network, instantiating and executing an emulated network device on a different set of hardware resources allocated from a different cloud machine. In some embodiments, the emulated network device executes a network device image. More specifically, when emulating a hardware router from the target physical network, the emulated network device executes a router image replicating the functionality and operation of that hardware router, and when emulating a hardware firewall appliance from the target physical network, the emulated network devices executes a firewall image replicating the functionality and operation of that hardware firewall appliance. Accordingly, the network device image is the operating system and software that controls the operations of a hardware network device. For example, a router image is responsible for building the various addressing tables (e.g., Address Resolution Protocol (ARP) tables, Border Gateway Protocol (BGP) tables, Link Aggregation Control Protocol (LACP) tables, Open Shortest Path First (OSPF) tables), and for routing or forwarding packets, frames, and other data based on the one or more tables. In some embodiments, the network device image is embedded within a host virtual machine that enables execution of the networking operations on different hardware platforms. The virtual machine can virtualize the network device hardware such that the network device image executes on a Linux host machine or other set of hardware resources allocated from a cloud machine. In some embodiments, the emulated network device creates the host virtual machine in which the network device image executes.

Different network device manufacturers provide at least the network device image for the emulated network devices. A different network device image can be provided for each of the manufacturer's network device models. Alternatively, a manufacturer can provide a single network device image for emulating two or more different hardware network devices. For instance, the Arista Extensible Operating System (EOS) is a single network operating system image that runs and controls routing functionality across different Arista network routing hardware. The EOS can also be run in a virtual machine with the virtual machine virtualizing the various Arista network routing hardware to allow execution of the router image on other hardware or machines, including Linux systems. Certain manufacturers may not expose the network device images for their hardware network devices or may not have developed network device images that can run outside or apart from the underlying network device hardware. In such cases, a network device image of a different manufacturer providing similar functionality could be used, or a generic network device image providing basic network device functionality could be used for the emulated network devices.

FIG. 1 presents a process 100 for creating emulated network devices that mirror hardware network devices of a target physical network in accordance with some embodiments. Process 100 is performed by an orchestrator of some embodiments. The orchestrator is a special purposed network replicating machine. With respect to FIG. 1, the network replicating machine replicates the topology of the target physical network in the cloud by provisioning and instantiating the emulated network devices that emulate the hardware network devices of the target physical network. The network replicating machine has network connectivity to one or more cloud service providers on which the target physical network is to be replicated.

Process 100 commences with enumeration (at 110) of the hardware network devices in the target physical network. The enumerated listing can be provided by the administrator of the target physical network. Alternatively, some embodiments run a trace script (e.g., traceroute) to map the hardware network devices in the target physical network. In the most basic form, the enumerated listing provides a number and type (e.g., router, switch, load balancer, firewall, etc.) of all the network devices in the target physical network. Additional information such as the interface addressing, specific make and model, versioning (e.g., operating system, configuration, etc.), location, and connectivity can be provided with the enumeration or at a later time.

The process provisions (at 120) a set of hardware resources from public or private cloud machines of one or more cloud service providers for each enumerated hardware network device. This includes provisioning one or more processors or processing cycles, memory, one or more network interfaces, network bandwidth, storage, or combinations thereof. The provisioned sets of hardware resources can have the same quantity of resources for each enumerated hardware network device. Alternatively, different resource quantities can be provisioned for different hardware network devices based on versioning, make, or model to account for different functionality or hardware of the network devices. The provisioning of different sets of hardware resources from different cloud service providers can be based on criteria such as cost, performance, location, and availability as some examples.

The process remotely accesses (at 130) each provisioned set of hardware resources through a cloud instance that the cloud service provider instantiates for each provisioned set of hardware resources. The cloud instance is a first-tier virtual machine that provides second-tier virtual machines instantiated and executing on the cloud instance access to the set of hardware resources provisioned from the underlying cloud machine. The emulated network device is an example of one such second-tier virtual machine.

Each cloud instance has a network interface that is linked to the physical ethernet interface of the underlying computing machine from which the set of hardware resources are provisioned. Through this physical ethernet interface, the cloud instance can communicate with other cloud instances. The physical ethernet interface is also the means by which emulated network devices executing within the cloud instances communicate with one another. However, as noted above, this physical ethernet interface will have addressing that differs from the addressing for the physical ethernet interfaces of the hardware network devices from a target physical network that is to be replicated.

The process creates (at 140) a host virtual machine on each provisioned set of hardware resources, wherein the host virtual machine becomes a second-tier virtual machine encapsulated within the first-tier virtual machines. In some embodiments, the host virtual machine contains the system and application framework (e.g., operating system and other system software) upon which the network device image executes.

Next, the process instantiates (at 150) a network device image to execute within the system and application framework of each host virtual machine. Execution of the network device image within the host virtual machine produces an emulated network device that replicates layer 2 and above functionality of a hardware network device in the target physical network. As noted above, some network device images embed a host virtual machine with the network device operational software such that steps 130 and 140 can be combined as a single step.

It should be noted that steps 120-150 above can be performed in parallel for each emulated network device that is created when replicating a target physical network having many hardware network devices. The parallel creation of emulated network devices is supported by a single cloud service provider, but can be accelerated when creating the emulated network devices across multiple cloud service providers. This parallel creation of emulated network devices allows for rapid replication of a target physical network of any size or scale.

Figure 2:
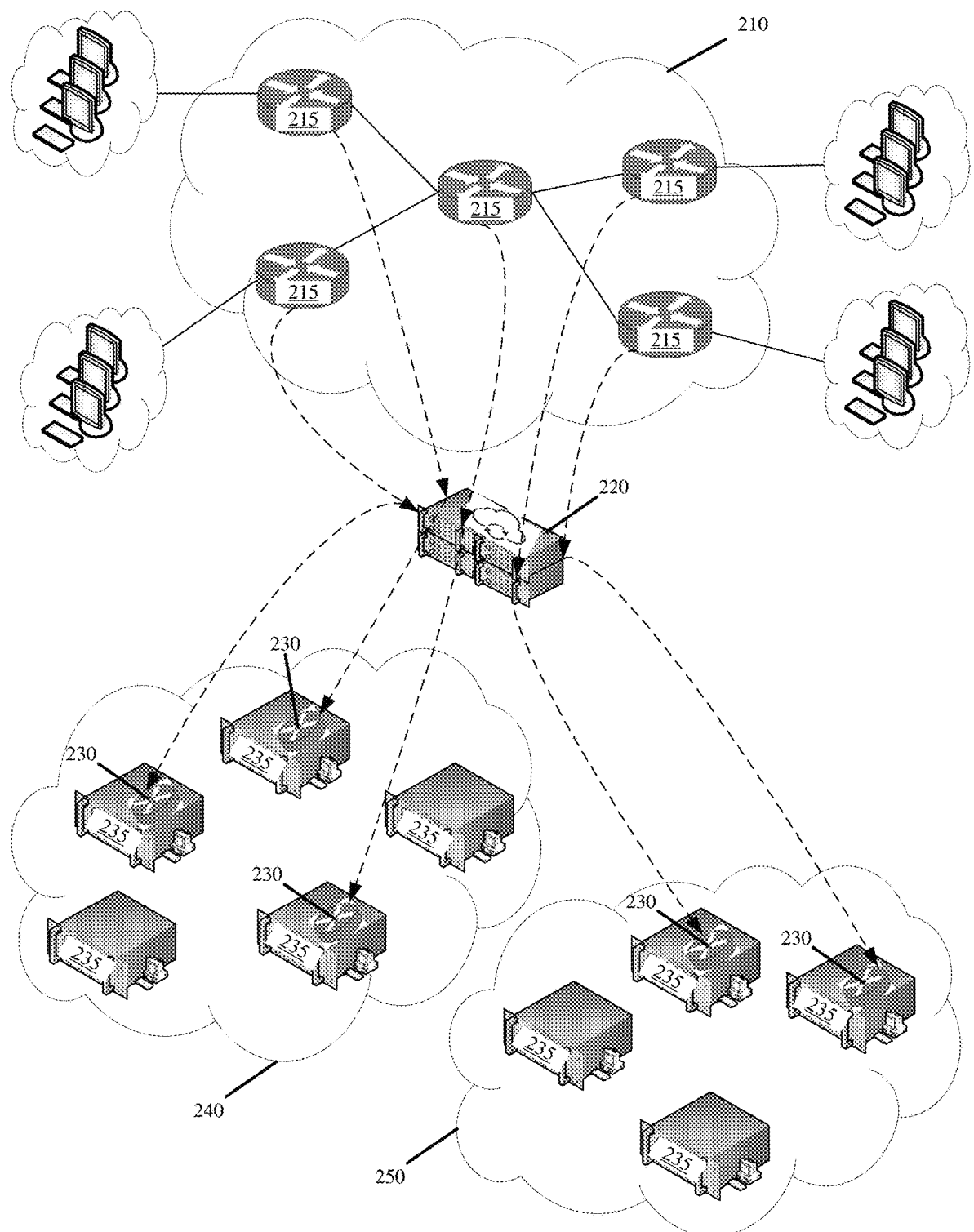
FIG. 2 conceptually illustrates the orchestrator creating different emulated network devices on arbitrary cloud instances to replicate hardware network devices of a target physical network in accordance with some embodiments.

FIG. 2 conceptually illustrates the orchestrator creating different emulated network devices on arbitrary cloud instances to replicate hardware network devices of a target physical network in accordance with some embodiments. As shown, the target physical network 210 is comprised of five hardware network devices 215. The orchestrator 220 maps the architecture and topology of the target physical network 210 in order to identify the five hardware network devices 215 that form the target physical network 210. The orchestrator then creates an emulated network device 230 within a different cloud instance provisioned on a different cloud machine 235 of two different cloud service providers 240 and 250 for each of the hardware network devices in the target physical network 210.

The next step in replicating the target physical network is to mirror the native communication that occurs between the hardware network devices of the target physical network on the instantiated emulated network devices of the replicated network. Such native communication is achieved by identifying the direct connections that exist between pairs of hardware network devices in the target physical network either through discovery or configuration, and by recreating those direct connections between pairs of emulated network devices emulating corresponding pairs of hardware network devices. In some embodiments, the direct connections between pairs of hardware network devices are determined from the Link Layer Discovery Protocol (LLDP) and/or one or more of the Address Resolution Protocol (ARP), Media Access Control (MAC), Link Aggregation Control Protocol (LCAP), and other addressing or routing tables of the hardware network devices. In some embodiments, the addressing or routing tables are provided by the administrator of the target physical network, are obtained from remotely accessing and inspecting the tables of the hardware network devices, or are rebuilt from sniffing packets flowing the target physical network.

Some embodiments reproduce the native communication and direct connectivity of the hardware network devices from the target physical network in the emulated network devices of the replicated network with nested overlay networks. A first overlay network provides a first set of direct logical connections between the cloud instances provisioned for the emulated network devices. Nested within the first set of direct logical connections is a second overlay network. The second overlay network is formed by creating virtual ethernet interfaces for the emulated network devices with addressing mirroring addressing of the hardware network device ethernet interfaces, and by leveraging the direct connectivity between the cloud instances provided by the first set of direct logical connections in order to form a different second set of direct logical connections between the virtualized ethernet interfaces of the emulated network devices, with the second set of direct logical connections mirroring the direct connectivity that exists between the hardware network devices in the target physical network.

Through the nested overlay networks, the same layer 2 frames, layer 3 packets, and other messaging that are sent and received by the network devices in the target physical network are sent and received without modification by the corresponding emulated network devices in the replicated network over the second set of direct logical connections. More specifically, first and second emulated network devices that are directly connected as a result of the nested overlay networks send and receive the same frames as first and second hardware network devices that are directly connected in the target physical network and that are emulated by the first and second emulated network devices. In some embodiments, this includes retaining the same addressing in the frames, packets, and other messaging that are exchanged in the target physical network for the frames, packets, and other messaging exchanged in the replicated network.

Figure 3:
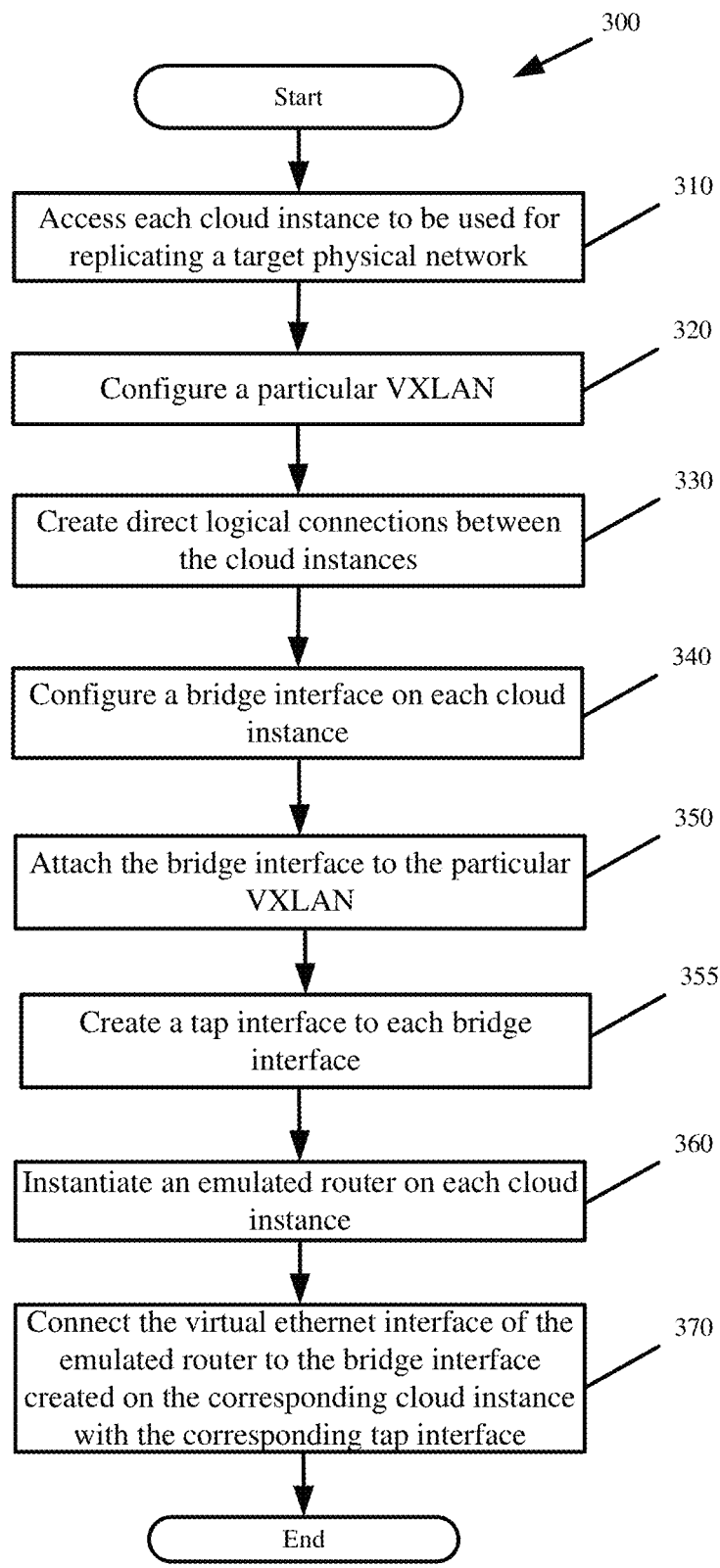
FIG. 3 presents a process for establishing the nested overlay networks in accordance with some embodiments.

FIG. 3 presents a process 300 for establishing the nested overlay networks in accordance with some embodiments. Process 300 is also performed by the orchestrator behind process 100 above. With respect to process 300, the network replicating machine of the orchestrator establishes, configures, and controls the nested overlay networks that reproduce the native communication and direct connectivity between the hardware network devices in the target physical network on the emulated network devices of the replicated network.

Figure 4:
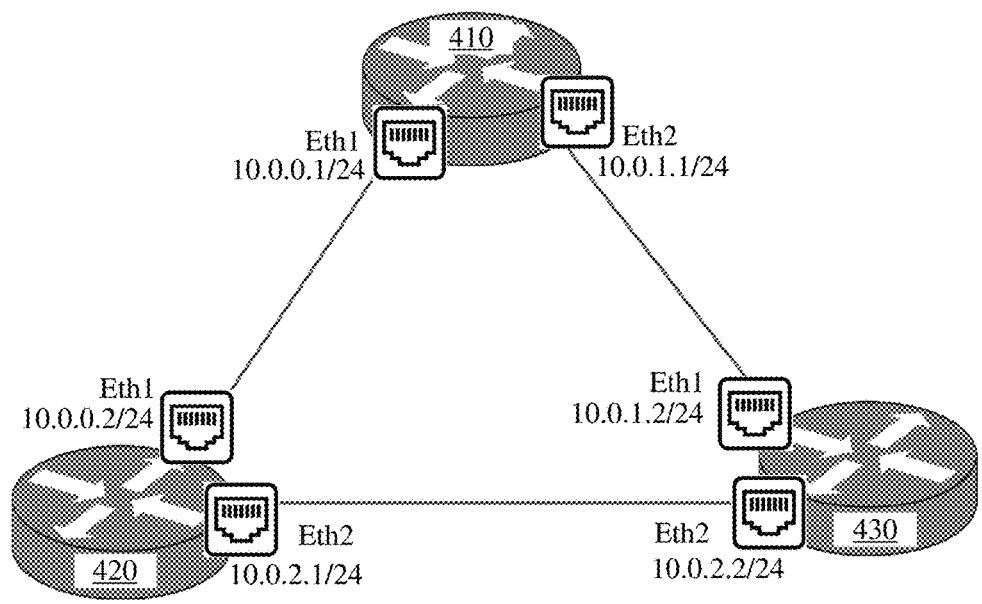
FIG. 4 conceptually illustrates a target physical network with three hardware network devices, the addressing for the various ethernet interfaces of the devices, and the direct connectivity between the devices that is subject to replication in the cloud in accordance with some embodiments.

The discussion of process 300 is keyed to the target physical network depicted in FIG. 4. Additional figures presented below visually demonstrate the various steps of process 300 for establishing the nested overlay networks.

FIG. 4 conceptually illustrates a target physical network with three hardware network devices 410, 420, and 430. FIG. 4 further illustrates the addressing for the various ethernet interfaces of the hardware network devices 410-430 and the direct connectivity between the hardware network devices 410-430.

Figure 5:
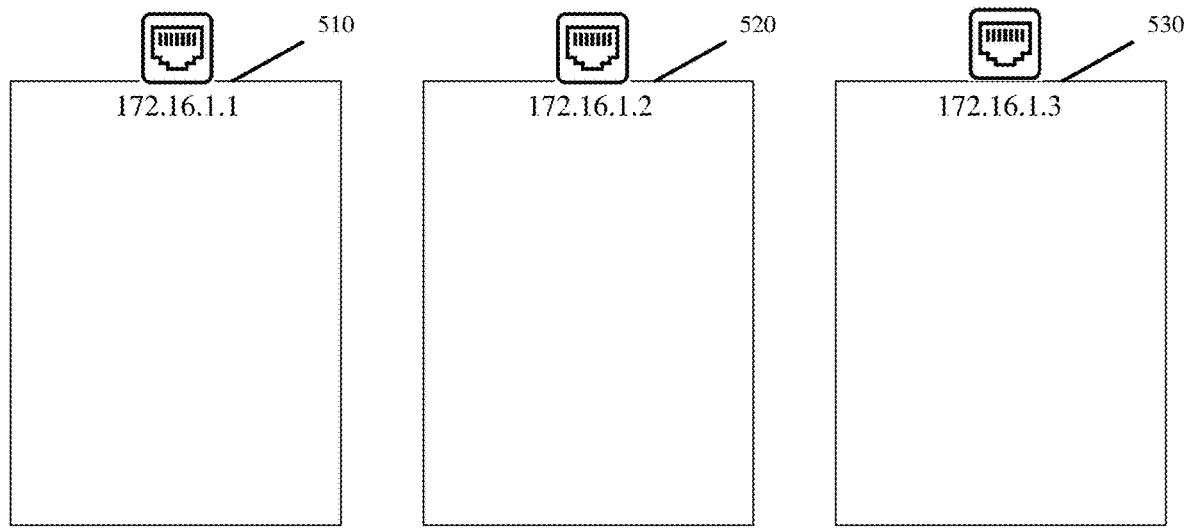
FIG. 5 conceptually illustrates three cloud instances on which the hardware network devices and target physical network of FIG. 4 are to be emulated.

FIG. 5 conceptually illustrates three cloud instances 510, 520, and 530 on which the hardware network devices 410-430 are to be emulated. Each cloud instance 510-530 is shown with a single ethernet interface and an address assigned to the ethernet interface. As can be seen, the addressing for the ethernet interfaces of the cloud instances 510-530 differs from the addressing of the ethernet interfaces of the hardware network devices 410-430. The cloud instances 510-530 can be created on any cloud machine (public or private) in any location. The cloud instances 510-530 need not, and likely do not, have the same direct connectivity as the hardware network devices 410-430 of the target physical network. More specifically, the cloud instances 510-530 are typically in different broadcast domains that are separated by at least one layer 3 routed network.

Process 300 commences by accessing (at 310) each of the cloud instances 510-530 to be used for replicating the target physical network of FIG. 4. Accessing the cloud instances 510-530 involves establishing a network connection to each cloud instance, providing access credentials (if necessary), and issuing commands for establishing a first overlay network to provide direct logical connectivity between the cloud instances 510-530.

To establish the first overlay network, the process first configures (at 320) a particular Virtual Extensible Local Area Network (VXLAN). In some embodiments, the orchestrator accesses each provisioned cloud instance via a digital network and secure access credentials, and issues a command, such as "ip link add vxlanXYZ type vxlan id [VXLAN_identifier] dstport 4789", to configure the particular VXLAN.

The process then places the cloud instances 510-530 on that same particular VXLAN. The particular VXLAN connects two or more layer 3 network domains to appear as a common layer 2 domain. By placing the cloud instances 510-530 on the same particular VXLAN, the cloud instances 510-530 will be able to communicate as if they were directly connected on the same layer 2 subnet. Layer 2 forwarding protocols pass layer 2 broadcasts and other frames along the particular VXLAN.

Placing the cloud instances 510-530 on the particular VXLAN involves creating (at 330) direct logical connections between the cloud instances 510-530. Each such direct logical connection terminates at the ethernet interface for accessing one of the cloud instances 510-530. These direct logical connections establish a layer 2 broadcast domain for the particular VXLAN.

Placing the cloud instances on the particular VXLAN further involves configuring (at 340) a bridge interface on each cloud instance and attaching (at 350) the bridge interface to the particular VXLAN. Each bridge interface is assigned a unique address different than the addressing of the ethernet interfaces. By attaching the bridge interface to the particular VXLAN, frames for the particular VXLAN arriving on the physical ethernet interface of the underlying cloud machine pass to the bridge interface. Similarly, frames for the particular VXLAN issued through the bridge interface pass through the direct logical connections of the particular VXLAN over to the bridge interfaces of the other cloud instances connected to the particular VXLAN. As will be described below, second-tier virtual machines (i.e., emulated network devices) running within the cloud instances 510-530 can communicatively access the particular VXLAN by connecting to the bridge interface created on the corresponding cloud instance.

Figure 6:
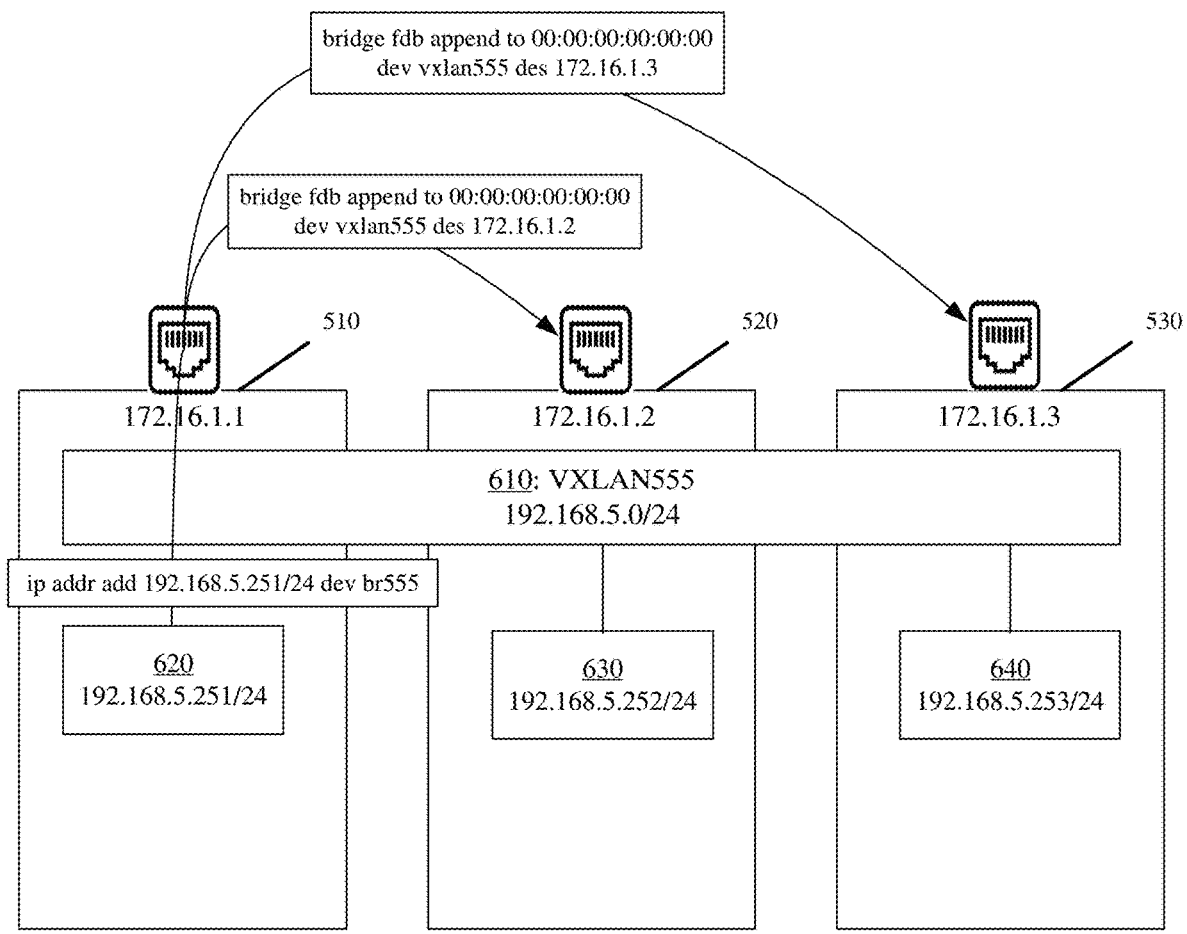
FIG. 6 conceptually illustrates creating direct logical connections between the different cloud instances of FIG. 5 based on bridge interfaces that connect the different cloud instances to a common VXLAN in accordance with some embodiments.

FIG. 6 conceptually illustrates creating direct logical connections between the different cloud instances 510-530 of FIG. 5 based on bridge interfaces 620, 630, and 640 that connect the different cloud instances 510-530 to a common VXLAN 610 in accordance with some embodiments. As shown in FIG. 6, the orchestrator configures the bridge interfaces 620-640 with the command "ip addr add [bridge_IPaddress] dev [bridge_identifier]". The orchestrator then creates direct logical connections between the cloud instances 510-530 through the VXLAN 610 using the configured bridge interface addressing. For instance, the orchestrator creates the direct logical connections with the command "bridge fdb append to 00:00:00:00:00:00 dev [VXLAN_identifier] dst [dest_ethintf_IPaddress]".

Figure 7:
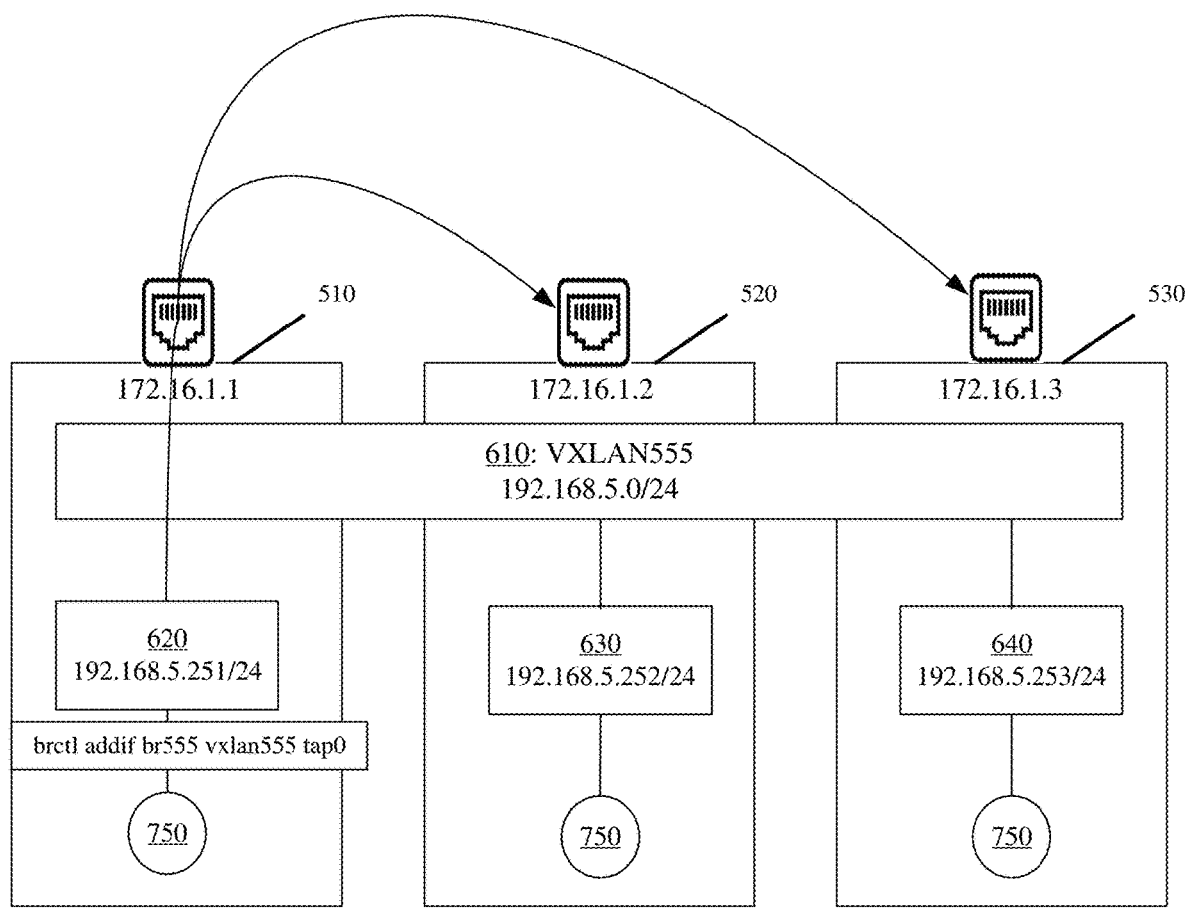
FIG. 7 conceptually illustrates creating the tap interfaces in accordance with some embodiments.

With reference back to process 300, the process creates (at 355) a tap interface to each bridge interface. The tap interface provides second-tier virtual machines access to the corresponding bridge interface on the same cloud instance. This access enables second-tier virtual machines to send and receive messaging through the particular VXLAN and the direct logical connections created between the cloud instances. FIG. 7 conceptually illustrates creating the tap interfaces 750 in accordance with some embodiments. In some embodiments, the orchestrator establishes the tap interfaces with the command "brctl addif [bridge_identifier] [VXLAN_identifier] [tap_name]".

The process instantiates (at 360) an emulated network device on each cloud instance. In some embodiments, instantiating the emulated network device comprises launching a host in which the network device image will execute, wherein the host is a second-tier virtual machine providing the system software or application software on which the network device image executes. As part of launching the host, the process creates a virtual ethernet interface for the host with an address in the same subnet as the bridge interface address.

The process then connects (at 370) the virtual ethernet interface of the host virtual machine for the emulated network device to the bridge interface created on the corresponding cloud instance using the corresponding tap interface. Connecting the emulated network device to the bridge interface provides the emulated network device with communicative access to the particular VXLAN, and more specifically, access to the layer 2 network created amongst the cloud instances by the first overlay network and the particular VXLAN.

Figure 8:
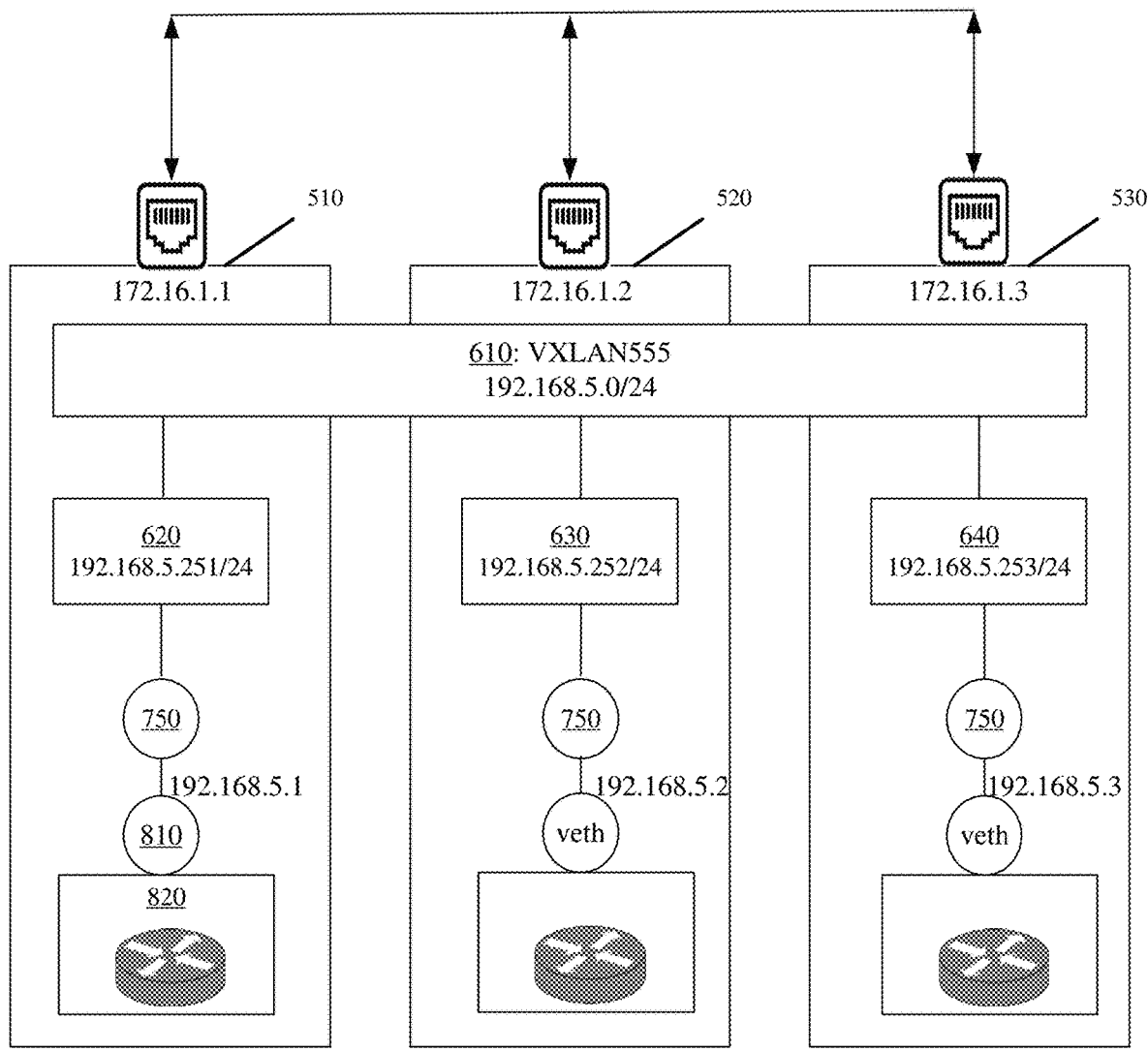
FIG. 8 conceptually illustrates connecting the virtual ethernet interface of the second-tier virtual machine for an instantiated emulated network device to the bridge interface 630 in accordance with some embodiments.

FIG. 8 conceptually illustrates connecting the virtual ethernet interface 810 of the second-tier virtual machine for an instantiated emulated network device 820 to the bridge interface 630 in accordance with some embodiments. The connection between the virtual ethernet interface 810 and the bridge interface 630 is made through the tap interface 750 to the bridge interface 630. The emulated network device 820 now has communicative access to the particular VXLAN 610.

The first overlay network described with reference to FIGS. 3-8 provides direct logical connectivity between the cloud instances provisioned from one or more cloud services providers and even the second-tier virtual machines for the emulated network devices. The cloud instances as well as the ethernet interfaces of the second-tier virtual machines are however assigned addressing that differs from the hardware network devices of the target physical network to be replicated. Accordingly, in order for the emulated network devices to communicate with one another, their frames, packets, and messaging traverse the first layer of different interfaces and addressing of the cloud instances and the second layer of different interfaces and addressing of the second-tier virtual machines. These additional layers separating the emulated network devices modify the frames that are sent and received by the emulated network devices.

In order to replicate the direct connectivity and native communications of the hardware network devices of the target physical network with the emulated network devices, some embodiments nest a second overly network within the first overlay network. The second overlay network removes the interface and addressing layer of the cloud instances and other intervening layers (i.e., second-tier virtual machines) between the emulated network devices. The second overlay network further serves to recreate the direct connections, addressing, and native communications that exists between the hardware network devices of the target physical network on the emulated network devices created on the cloud instances.

Figure 9:
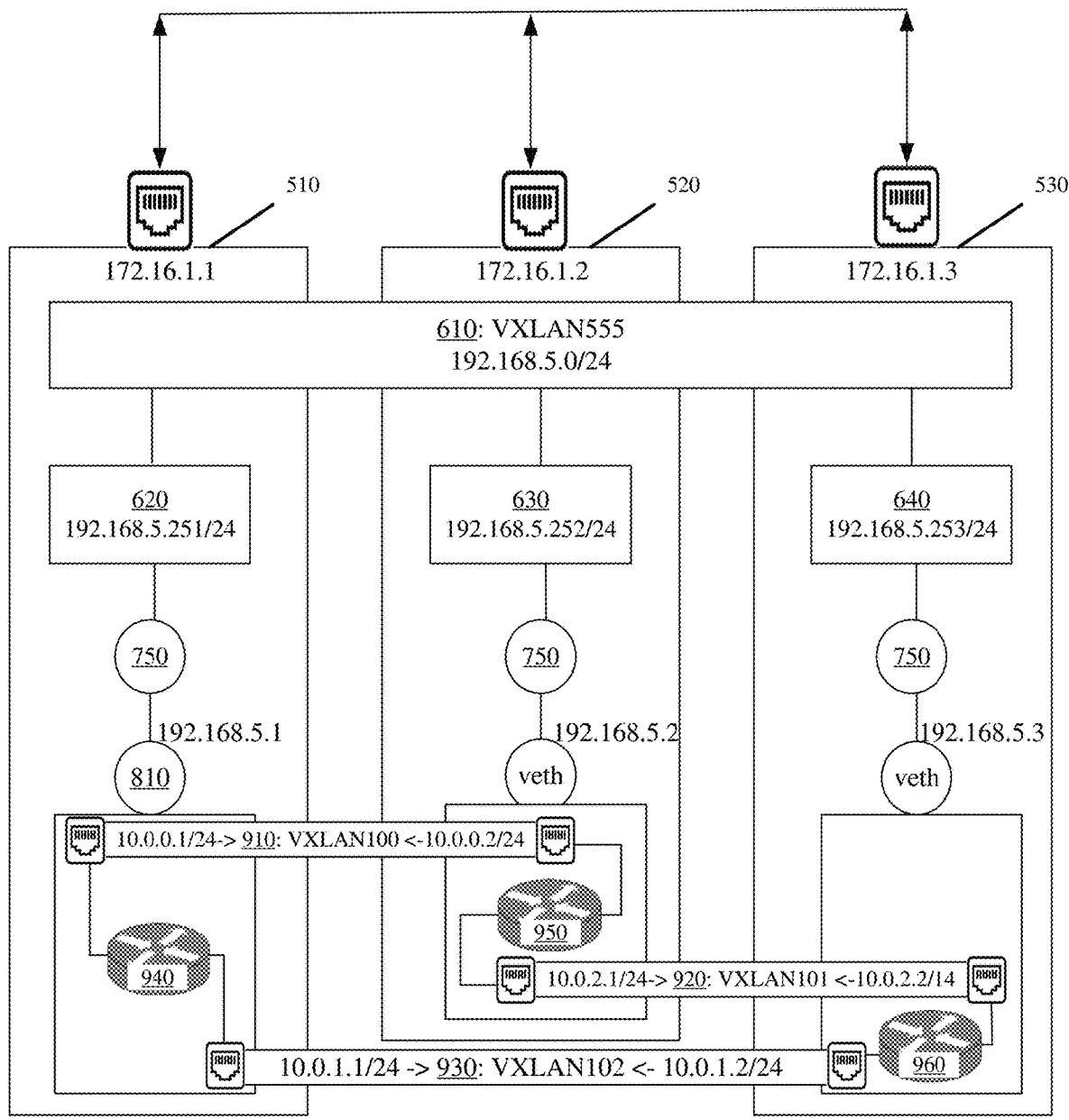
FIG. 9 conceptually illustrates creating the set of secondary VXLANs of the second overlay network within the particular VXLAN of the first overlay network in accordance with some embodiments.

In some embodiments, the second overlay network is a set of secondary VXLANs that are nested within the particular VXLAN of the first overlay network. FIG. 9 conceptually illustrates creating the set of secondary VXLANs of the second overlay network within the particular VXLAN of the first overlay network in accordance with some embodiments.

As shown in FIG. 9, the set of secondary VXLANs comprise three VXLANs 910, 920, and 930 that create direct logical connections between the emulated network devices 940, 950, and 960 that mirror the direct connections between the corresponding hardware network devices of the target physical network illustrated in FIG. 4 above. In particular, a first VXLAN 910 with a first VXLAN identifier is created between a first virtual ethernet interface of a network device image running on the first emulated network device 940 and a first virtual ethernet interface of a network device image running on the second emulated network device 950 in order to replicate the direct connection between hardware network devices 410 and 420 in FIG. 4, a second VXLAN 920 with a second VXLAN identifier is created between a second virtual ethernet interface of the network device image running on the second emulated network device 950 and a second virtual ethernet interface of a network device image running on the third emulated network device 960 in order to replicate the direct connection between hardware network devices 420 and 430 in FIG. 4, and a third VXLAN 930 with a third VXLAN identifier is created between a second virtual ethernet interface of a network device image running on the first emulated network device 940 and a first virtual ethernet interface of the network device image running on the third emulated network device 960 in order to replicate the direct connection between hardware network devices 410 and 430 in FIG. 4.

The set of secondary VXLANs establishes the direct logical connectivity between the emulated network devices that mirrors the direct connectivity between the hardware network devices of the target physical network. This places the emulated network devices on layer 2 broadcast domains that mirror the broadcast domains within the target physical network.

As further shown in FIG. 9, the virtual ethernet interfaces created on the network device images are assigned identical addressing to the ethernet interfaces of the hardware network devices in the target physical network of FIG. 4. This replication of the connectivity as well as the addressing allows the emulated network devices to mirror the native communication that occurs between the hardware network devices of the target physical network. In particular, the very same frames exchanged between the hardware network devices, with the very same addressing, are exchanged between the emulated network devices.

Figure 10:
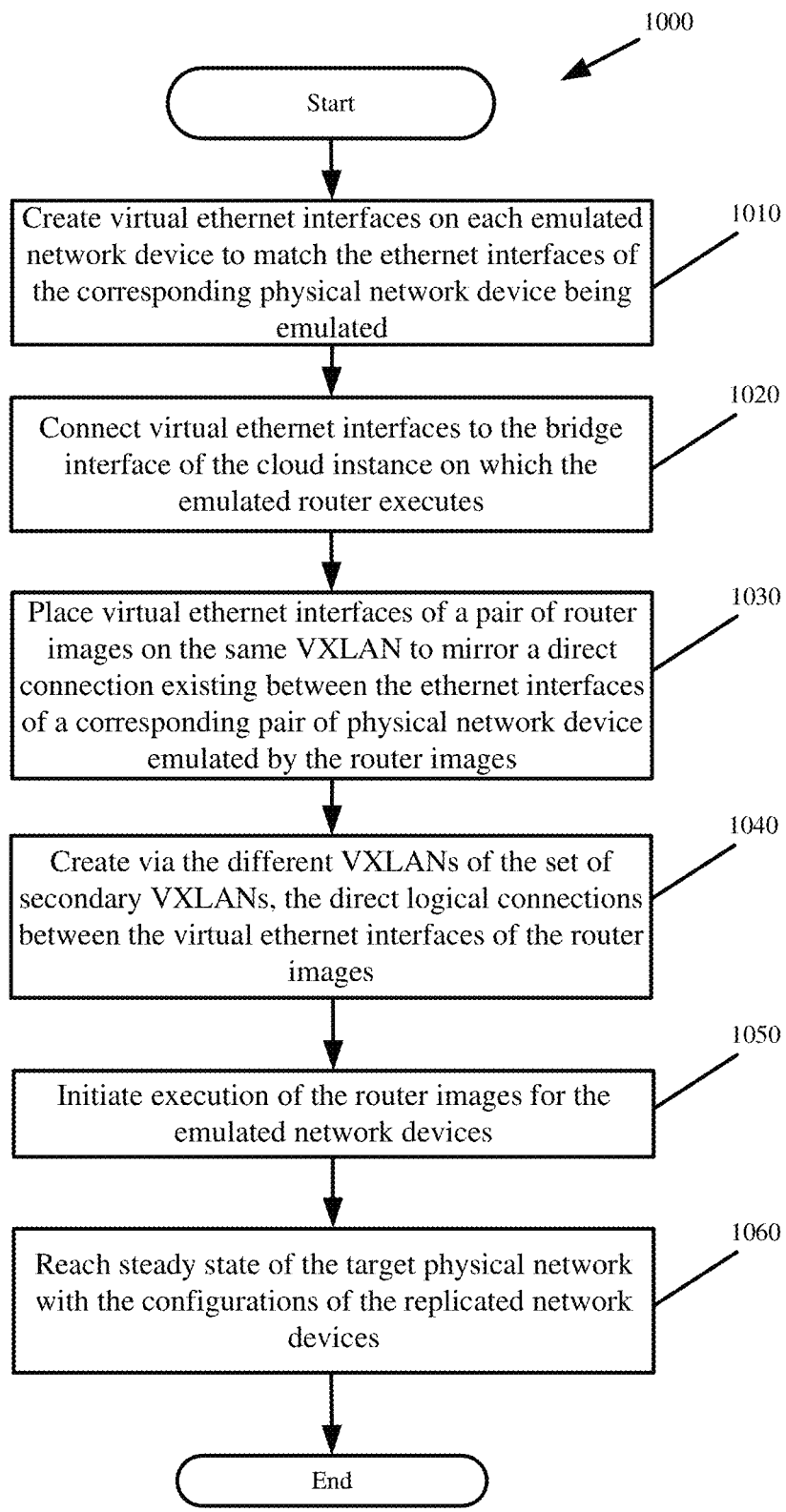
FIG. 10 presents a process for creating the set of secondary VXLANs for the second overlay network in accordance with some embodiments.

FIG. 10 presents a process 1000 for creating the set of secondary VXLANs for the second overlay network in accordance with some embodiments. Process 1000 is performed by the orchestrator in response to instantiating the emulated network devices on the cloud instances.

Process 1000 commences by creating (at 1010) one or more virtual ethernet interfaces on the network device image of each particular emulated network device to mirror the one or more ethernet interfaces of the corresponding hardware network device of the target physical network that is emulated by that particular emulated network device. As noted above, each virtual ethernet interface can be created with the same addressing as the corresponding ethernet interface of the hardware network device from the target physical network that is being emulated. FIG. 9 illustrates the virtual ethernet interfaces having the same addressing as the ethernet interfaces for the network devices in the target physical network of FIG. 4.

The process connects (at 1020) the virtual ethernet interfaces to the bridge interface of the cloud instance on which the emulated network device executes via the corresponding tap interface. This completes the bridge such that frames, packets, and other data communications exiting the virtual ethernet interface of the emulated network device pass through the ethernet interface of the cloud instance and exit out the particular VXLAN of the first overlay network using layer 2 forwarding protocols without requiring any changes to the addressing of the packets.

The process then creates the set of secondary VXLANs between the virtual ethernet interfaces of the network device images to reproduce on the emulated network devices, the direct connectivity existing between the corresponding ethernet interfaces of the hardware network devices in the target physical network. To do so, the process places (at 1030) the virtual ethernet interfaces of a pair of network device images on the same VXLAN to mirror a direct connection existing in the target physical network between the ethernet interfaces of a pair of hardware network devices emulated by the emulated network devices on which the pair of network device images execute. One such VXLAN is created for each direct connection that exists in the target physical network. These VXLANs form the set of secondary VXLANs of the second overlay network.

The process then creates (at 1040) via the different VXLANs of the set of secondary VXLANs, the direct logical connections between the virtual ethernet interfaces of the network device images using the same exact addressing as found for the direct connections between the corresponding hardware network devices of the target physical network. In particular, the destination address for the endpoint of each VXLAN of the set of secondary VXLANs is set, wherein the destination address is the address configured for the virtual ethernet interface of each network device image at which the direct logical connection terminates. The creation of the direct logical connections between the virtual ethernet images for the network device images of the emulated network devices is similar to the creation of the direct logical connections between the cloud instances described above with reference to FIG. 6.

The process initiates (at 1050) execution of the network device images for the emulated network devices. Initiating execution causes the emulated network devices to exchange addressing information with other emulated network devices that are directly connected based on the set of secondary VXLANs. After some duration, the process reaches (at 1060) the steady state of the target physical network with the replicated network, and more specifically, with the configurations of the emulated network devices, wherein upon reaching the steady state, the configurations of the emulated network devices recreate the various addressing and routing tables present in the corresponding hardware network devices of the target physical network.

Upon reaching the steady state, the emulated network devices, and more specifically, the network device images of the emulated network devices have the same connectivity, addressing, and native communications as the hardware network devices in the target physical network. In other words, the very same frames, packets, and other data communications sent from a source emulated network device through a bridge interface and over the particular VXLAN of the first overlay network arrive at a destination emulated network device with a direct logical connection to the source emulated network device based on one of the set of secondary VXLANs. The replicated network can therefore mirror the layer 2 broadcasts, addressing/connectivity information, and packet forwarding that occur between the hardware network devices of the target physical network.

In the embodiments above, the network device images are container based. A container based network device image provides full access to the network device core functionality and configuration. Accordingly, the host virtual machine (i.e., second-tier virtual machine) can be used to directly configure the network device image and create the virtual ethernet interfaces and VXLANs as needed.

Some other embodiments allow network replication with hypervisor based network device images. In some such embodiments, the network device image is provided as a closed binary. The closed binary prevents the orchestrator from creating the virtual ethernet interfaces and the VXLANs on the network device image. In such cases, the orchestrator defaults to configuring a set of Virtual Local Area Networks (VLANs) on the virtual ethernet interface provided by the closed binary. Each VLAN emulates a direct connection between two network devices albeit on the same ethernet interface.

Figure 11:
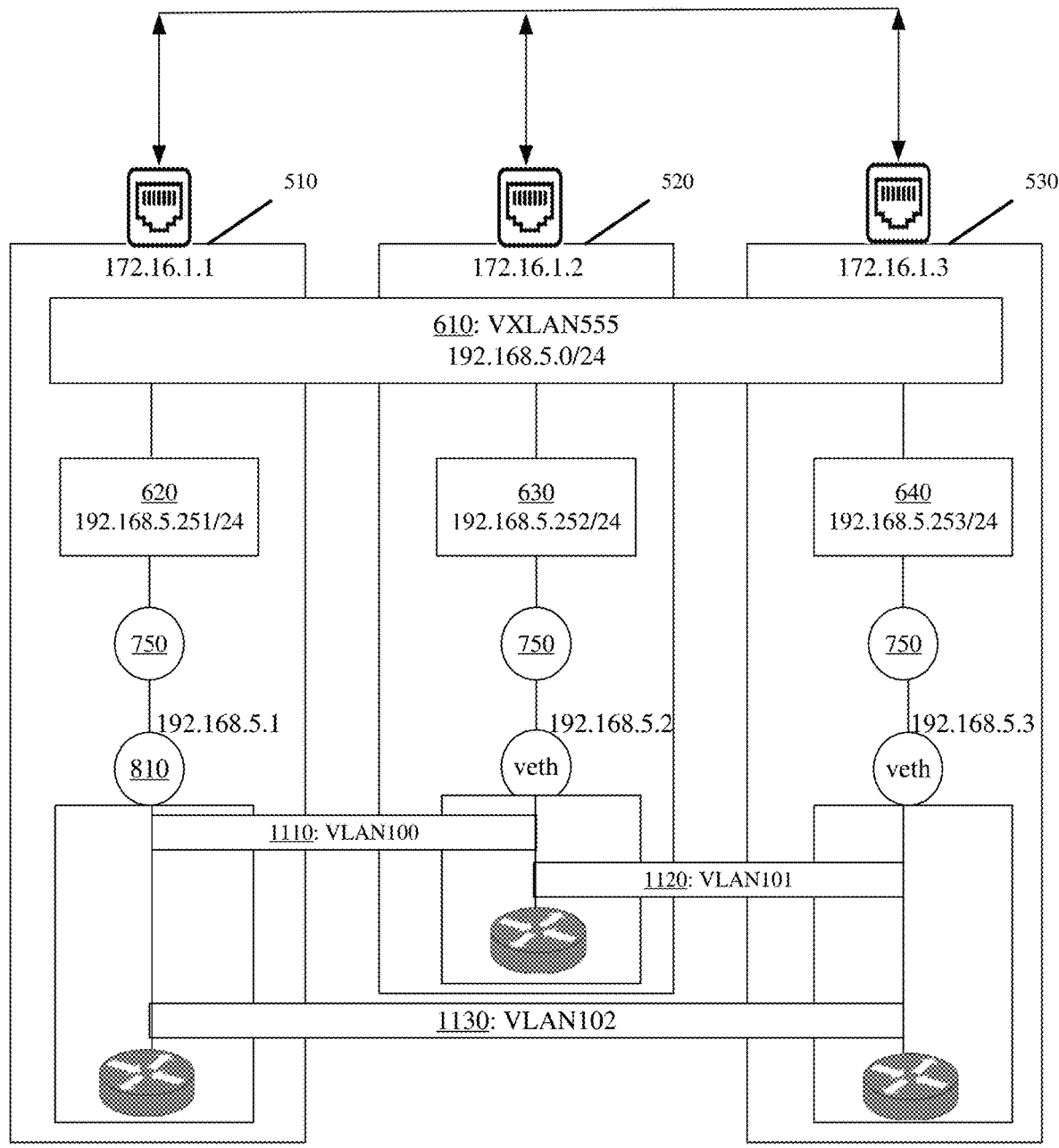
FIG. 11 conceptually illustrates nesting a second overlay network comprised of a set of VLANs in the first overlay network comprised of a VXLAN in accordance with some embodiments.

FIG. 11 conceptually illustrates nesting a second overlay network comprised of a set of VLANs in the first overlay network comprised of a VXLAN in accordance with some embodiments. In FIG. 11, a single ethernet interface of each network device image is configured so that packets tagged with different VLAN identifiers 1110, 1120, and 1130 are forwarded through different direct logical connections to different emulated network devices.

In some such embodiments, the native communication between network devices of the target physical network is somewhat altered by introducing the VLAN tags in the packets exchanged between the network device instances. The nested overlay networks otherwise fully replicate the target physical network with the introduction of the VLAN tags having no effect on validating changes to the network device configurations.

III. Network Validation

The replication of the target physical network in the cloud provides a safe environment to holistically and comprehensively validate any changes to the target physical network before deployment thereto. In particular, the replicated network reproduces the exact end state that would result on the target physical network if one or more configuration changes are made to one or more of the hardware network devices rather than corresponding emulated network devices of the replicated network, wherein the end state differs from the steady state by at least one changed network path, changed addressing, changed routing behavior, changed security behavior, etc. The ability to detect all such changes in a safe environment is extremely valuable to any network operator, and is especially valuable to operators of large networks in which comprehensive and holistic observation of the end state would be impossible to detect, test, or predict because of the sheer number of variables and interrelationships.

Figure 12:
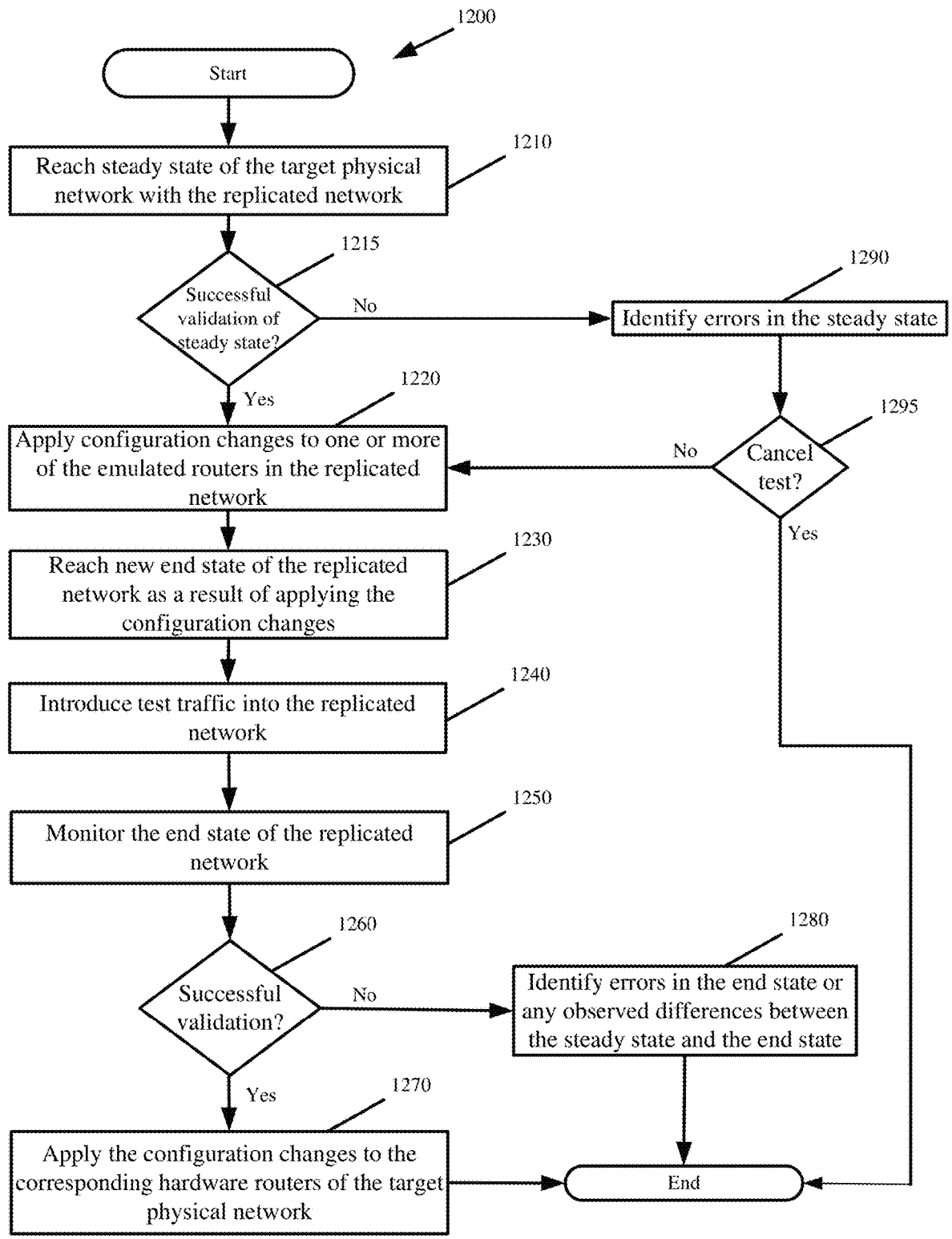
FIG. 12 presents a process for validating a configuration change intended for a target physical network through the replicated network of some embodiments.

FIG. 12 presents a process 1200 for validating a configuration change intended for a target physical network through the replicated network of some embodiments. The process commences in response to replicating the direct connectivity and native communications of the target of physical network in the cloud according to the methodologies described above. Before validation of a configuration change is made, the process executes the emulated network devices of the replicated network so that the replicated network arrives (at 1210) at the steady state of the target physical network that is replicated. Before the emulated network devices reach the steady state, the emulated network devices exchange route and addressing information and build ARP, BGP, and other network routing tables from the exchanged information.

Once the steady state is achieved, an initial validation (at 1215) of the steady state is performed. This initial validation scans the steady state for any pre-existing errors including loops, blackholes, and other errors from improper addressing or connectivity. Pre-existing errors can void or otherwise compromise the end state resulting from a configuration change. In other words, the true end state resulting from a configuration change may not be reached because pre-existing errors prevent the configuration change from having the desired effect on the network or alter the effect the configuration change has on the network.

In response to detecting pre-existing errors in the steady state, the process may end or present (at 1290) the errors to the network administrator. The network administrator can then choose to correct the errors before testing the configuration changes or move ahead (at 1295) with the test despite the identified errors.

In response to successfully validating the steady state with no errors, the process applies (at 1220) one or more configuration changes under test to one or more of the emulated network devices. This can include introducing new addressing, pulling existing advertised addressing, changing routing or forwarding policies, or simulating a failure of one or more emulated network devices or interconnection links as some examples. The configuration changes are intended for a specific set of hardware network devices of the target physical network and are therefore applied to the set of emulated network devices that emulate that specific set of hardware network devices with the same connectivity, addressing, and native communication.

Some additional period of time passes until the replicated network reaches (at 1230) the end state that results from the one or more configuration changes. Again, the amount of time depends on the ripple effect or propagation time of the changes through the replicated network and the number of emulated network devices impacted by the changes. The end state is reached once no additional changes are made to any of the routing or addressing tables of the emulated network devices.

Optionally, the process introduces (at 1240) test traffic into the replicated network. The test traffic can expedite the propagation of the configuration changes throughout the network and can also be used to test the response of the replicated network after the end state is reached. The test traffic can also be an indication of when the end state is reached. In particular, when the routing of the test traffic is complete, the end state can be analyzed. In some embodiments, the test traffic is a sampling of the network traffic from the target physical network. In some embodiments, the test traffic simulates different attacks or desired conditions.

The process monitors (at 1250) the end state of the replicated network. In some embodiments, the monitoring involves detecting black holes (i.e., connectivity issues) or loops that form anywhere in the replicated network as a result of the applied changes. In some embodiments, the monitoring involves taking snapshots of the emulated network device routing and addressing tables and comparing the snapshots against routing and addressing table snapshots taken from the emulated network devices at the steady state prior to applying the configuration changes at step 1220. In some embodiments, the monitoring involves running a series of scripts, test cases, pings, traceroutes, etc. to detect connectivity issues or observe the routing or forwarding behavior of the emulated network devices. From such monitoring, erroneous or anomalous behavior including improper forwarding or routing of packets, packet loss, and improper modification of packets can be detected.

The process validates (at 1260) the end state based on whether the monitoring detected any error or anomalous behavior. If the end state is successfully validated without any errors or anomalous behavior, the process applies (at 1270) the configuration changes to the corresponding hardware network devices of the target physical network. In response to unsuccessful validation, the process identifies (at 1280) any errors in the end state or any observed differences between the steady state and the end state. A network administrator can then determine if the end state is desired or if the configuration changes require modification.

IV. System

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 13:
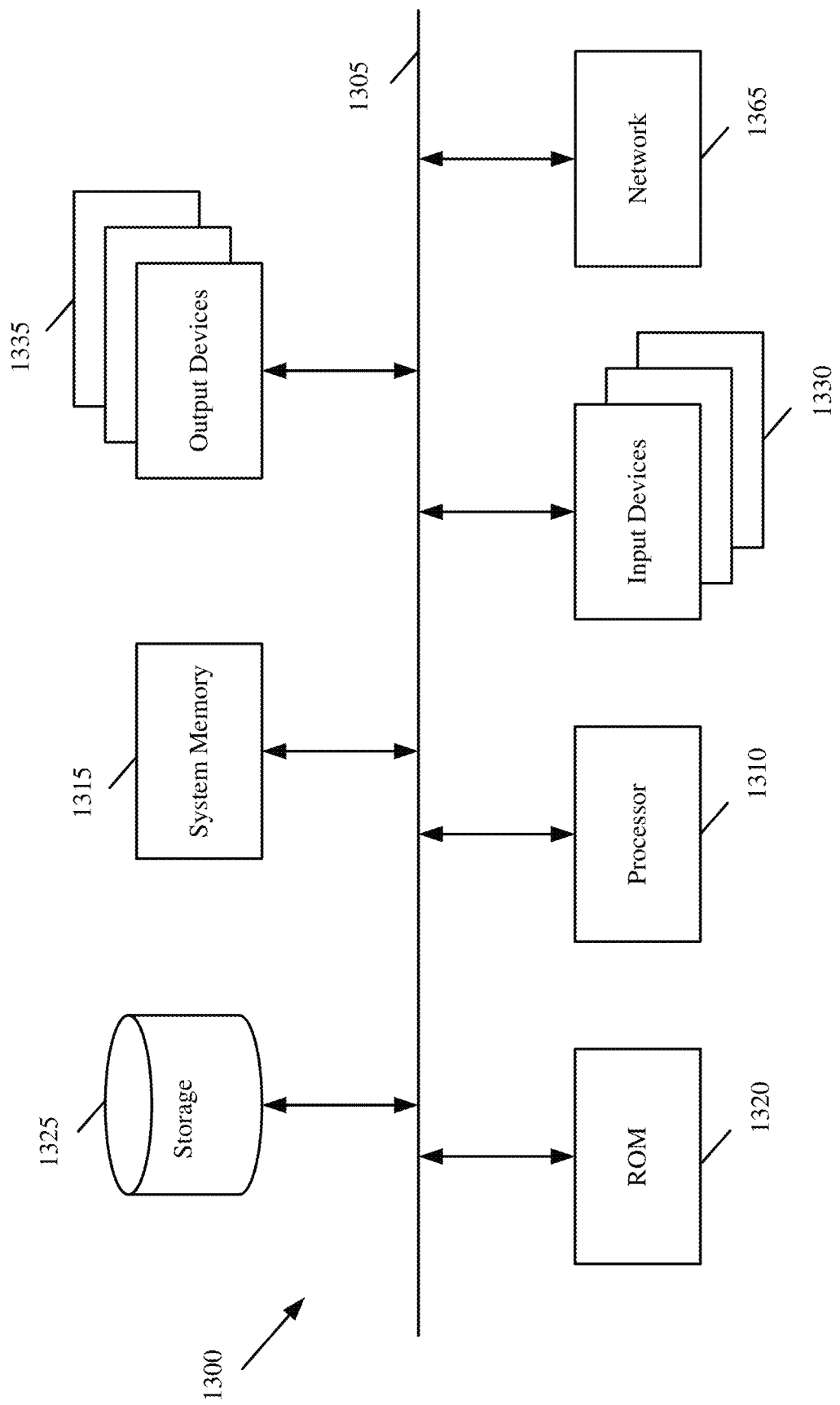
FIG. 13 illustrates a computer system or server with which some embodiments are implemented.

FIG. 13 illustrates a computer system or server with which some embodiments are implemented. Such a computer system includes various types of computer-readable mediums and interfaces for various other types of computer-readable mediums that implement the various methods and machines described above (e.g., orchestrator, machines on which the virtual machines execute, etc.). Computer system 1300 includes a bus 1305, a processor 1310, a system memory 1315, a read-only memory 1320, a permanent storage device 1325, input devices 1330, and output devices 1335.

The bus 1305 collectively represents all system, peripheral, and chipset buses that communicatively connect the numerous internal devices of the computer system 1300. For instance, the bus 1305 communicatively connects the processor 1310 with the read-only memory 1320, the system memory 1315, and the permanent storage device 1325. From these various memory units, the processor 1310 retrieves instructions to execute and data to process in order to execute the processes of the invention. The processor 1310 is a processing device such as a central processing unit, integrated circuit, graphical processing unit, etc.

The read-only-memory (ROM) 1320 stores static data and instructions that are needed by the processor 1310 and other modules of the computer system. The permanent storage device 1325, on the other hand, is a read-and-write memory device. This device is a non-volatile memory unit that stores instructions and data even when the computer system 1300 is off. Some embodiments of the invention use a mass-storage device (such as a magnetic or optical disk and its corresponding disk drive) as the permanent storage device 1325.

Other embodiments use a removable storage device (such as a flash drive) as the permanent storage device. Like the permanent storage device 1325, the system memory 1315 is a read-and-write memory device. However, unlike storage device 1325, the system memory is a volatile read-and-write memory, such as random access memory (RAM). The system memory stores some of the instructions and data that the processor needs at runtime. In some embodiments, the processes are stored in the system memory 1315, the permanent storage device 1325, and/or the read-only memory 1320.

The bus 1305 also connects to the input and output devices 1330 and 1335. The input devices enable the user to communicate information and select commands to the computer system. The input devices 1330 include alphanumeric keypads (including physical keyboards and touchscreen keyboards), pointing devices. The input devices 1330 also include audio input devices (e.g., microphones, MIDI musical instruments, etc.). The output devices 1335 display images generated by the computer system. The output devices include printers and display devices, such as cathode ray tubes (CRT) or liquid crystal displays (LCD).

Finally, as shown in FIG. 13, bus 1305 also couples computer 1300 to a network 1365 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 1300 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
providing a set of hardware resources from a different machine of a plurality of distributed machines for each hardware network device of a plurality of hardware network devices in a data network;
emulating operation of each particular hardware network device of the plurality of hardware network devices with a network device image executing a network configuration of the particular hardware network device on the set of hardware resources of a diffrent machine of the plurality of distributed machines;
connecting network interfaces of the plurality of distributed machines to at least a first Virtual Extensible Local Area Network (VXLAN); and
creating between different pairs of the network device images, a plurality of logical connections that mirror connections between different pairs of the plurality of hardware network devices, wherein said creating comprises connecting network interfaces of the different pairs of the network device images to a different VXLAN of a set of second VXLANs, wherein the set of second VXLANs is nested within the first VXLAN.

2. The method of claim 1, wherein the first VXLAN is a first overlay network.

3. The method of claim 2, wherein the set of second VXLANs is a second overlay network that is nested within the first overlay network.

4. The method of claim 1 further comprising creating a plurality of virtual machines on the set of hardware resources of the plurality of distributed machines, the plurality of virtual machines comprising virtual interfaces with addressing matching addressing of the plurality of hardware network devices, and wherein said emulating comprises instantiating each network device image within a different virtual machine of the plurality of virtual machines.

5. The method of claim 1 further comprising monitoring a steady state resulting from each network device image executing the network configuration of a different hardware network device of the plurality of hardware network devices.

6. The method of claim 5 further comprising modifying the network configuration executed by a particular network device image, and detecting steady state deviations based on modifications to addressing tables or routing operations of one or more network device images as a result of said modifying.

7. The method of claim 1 further comprising creating virtual network interfaces with addressing matching the addressing of network interfaces of the plurality of hardware network devices, and connecting each network device image to a different virtual network interface.

8. The method of claim 7 further comprising terminating each logical connection of the plurality of logical connections at a pair of virtual network interfaces having addressing that matches addressing of network interfaces of a pair of the hardware network devices at which a corresponding connection between a different pair of the plurality of hardware network devices terminates.

9. The method of claim 1 further comprising mirroring routing information and operation of the plurality of hardware network devices through routing information and operation of each network device image based on each network device image exchanging layer 2 frames via the plurality of logical connections.

10. The method of claim 9 further comprising changing the network configuration of a particular hardware network device executed by a particular network device image.

11. The method of claim 10 further comprising detecting changes to the routing information or operation of one or more network device images in response to said changing the network configuration.

12. A system comprising:
- a plurality of distributed machines, each distributed machine of the plurality of distributed machines comprising a set of hardware resources;
- a non-transitory computer-readable medium storing a set of processor-executable instructions; and
- one or more processors configured to execute the set of processor-executable instructions, wherein executing the set of processor-executable instructions causes the one or more processors to:
  - emulate operation of each particular hardware network device of a plurality of hardware network devices in a data network with a network device image executing a network configuration of the particular hardware network device on the set of hardware resources of a different machine of the plurality of distributed machines;
  - connect network interfaces of the plurality of distributed machines to at least a first Virtual Extensible Local Area Network (VXLAN); and
  - create between different pairs of the network device images, a plurality of logical connections that mirror connections between different pairs of the plurality of hardware network devices, wherein said creating comprises connecting network interfaces of the different pairs of the network device images to a different VXLAN of a set of second VXLANs, wherein the set of second VXLANs is nested within the first VXLAN.

13. The system of claim 12, wherein the processor-executable instructions further include processor-executable instructions to create a plurality of virtual machines on the set of hardware resources of the plurality of distributed machines, the plurality of virtual machines comprising virtual interfaces with addressing matching addressing of the plurality of hardware network devices, and wherein said emulating comprises processor-executable instructions to instantiate each network device image within a different virtual machine of the plurality of virtual machines.

14. The system of claim 12, wherein the processor-executable instructions further include processor-executable instructions to monitor a steady state resulting from each network device image executing the network configuration of a different hardware network device of the plurality of hardware network devices.

15. The system of claim 14, wherein the processor-executable instructions further include processor-executable instructions to modify the network configuration executed by a particular network device image, and detect steady state deviations based on modifications to addressing tables or routing operations of one or more network device images as a result of said modifying.

16. The system of claim 12, wherein the processor-executable instructions further include processor-executable instructions to create virtual network interfaces with addressing matching the addressing of network interfaces of the plurality of hardware network devices, and connect each network device image to a different virtual network interface.

17. The system of claim 16, wherein the processor-executable instructions further include processor-executable instructions to terminate each logical connection of the plurality of logical connections at a pair of virtual network interfaces having addressing that matches addressing of network interfaces of a pair of the hardware network devices at which a corresponding connection between a different pair of the plurality of hardware network devices terminates.

18. The system of claim 12, wherein the processor-executable instructions further include processor-executable instructions to mirror routing information and operation of the plurality of hardware network devices through routing information and operation of each network device image based on each network device image exchanging layer 2 frames via the plurality of logical connections.

19. The system of claim 18, wherein the processor-executable instructions further include processor-executable instructions to change the network configuration of a particular hardware network device executed by a particular network device image.

20. The system of claim 19, wherein the processor-executable instructions further include processor-executable instructions to detect changes to the routing information or operation of one or more network device images in response to said changing the network configuration.

* * * * *